United States Patent
Yugawa et al.

[11] Patent Number: 5,875,297
[45] Date of Patent: Feb. 23, 1999

[54] MULTIMEDIA SERVER

[75] Inventors: Taihei Yugawa; Kunihiko Sakoda, both of Osaka, Japan

[73] Assignee: Matsushita Electric Industrial Co., Ltd., Osaka, Japan

[21] Appl. No.: 610,654

[22] Filed: Mar. 4, 1996

[30] Foreign Application Priority Data

Mar. 2, 1995 [JP] Japan ..................................... 7-042922

[51] Int. Cl.⁶ ................................................. H04L 12/00
[52] U.S. Cl. ............................... 395/200.32; 395/200.33; 395/200.47
[58] Field of Search ............................... 395/200.03, 114, 395/329, 334, 335, 842, 200.32, 200.33, 200.47, 200.49, 200.57, 200.61

[56] References Cited

U.S. PATENT DOCUMENTS 5,517,652  5/1996  Miyamoto et al. ..................... 395/800

FOREIGN PATENT DOCUMENTS

4-42320  2/1992  Japan .

Primary Examiner—Thomas Peeso
Attorney, Agent, or Firm—Beveridge, DeGrandi, Weilacher & Young, LLP

[57] ABSTRACT

A multimedia server has: a server section having a transfer-request accepting section for accepting a transfer request for data, a processor connected to the transfer-request accepting section, for discriminating the kind of the data and for converting the transfer request to a transfer instruction, and a bus interface; a storage device for storing data; an accelerator section having a storage-device interface for interfacing to the storage device and for retrieving data therefrom, a data transfer section for transferring the data, a processor for processing the transfer instruction issued from the server section, and for issuing a transfer instruction to have the data transferred from the storage-device interface to the data transfer section and then issuing a transfer instruction to the data transfer section to transfer the data to a requesting destination, and a bus interface; and a bus for connecting the server section with the accelerator section.

19 Claims, 5 Drawing Sheets

MULTIMEDIA SERVER

BACKGROUND OF THE INVENTION

1. Field of the Invention

The present invention relates to a video server (multimedia server) using a computer or the like.

2. Related Art of the Invention

Figure 2:
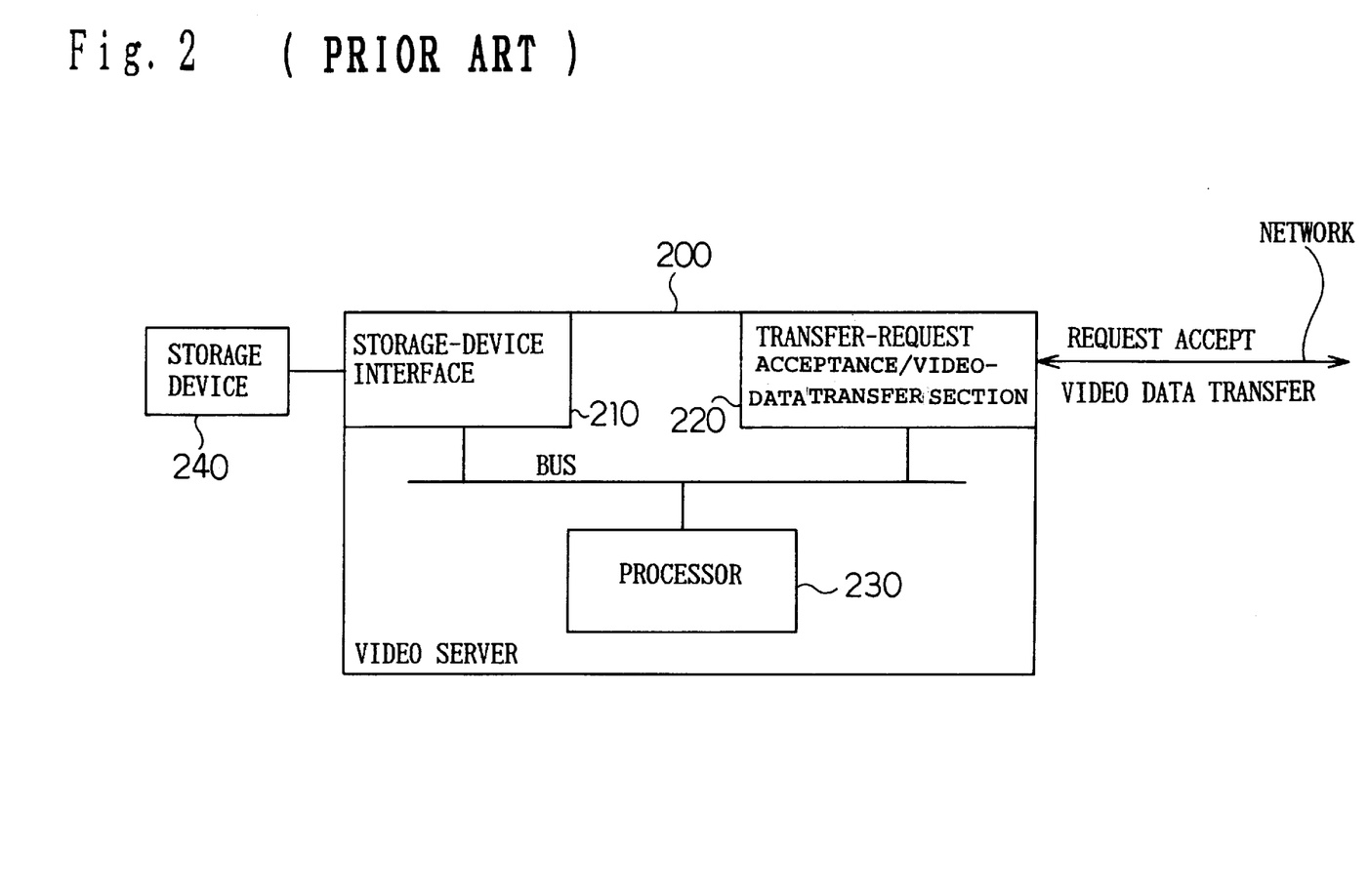
FIG. 2 is a schematic diagram of a system using a video server of a bus-connection type according to the prior art.

The prior art will be described with reference to drawings. FIG. 2 is a diagram showing an example in which a single entity constitutes a video server as a system. The video server 200 comprises: an interface 210 for interfacing to a storage device 240; a processor 230; a transfer-request acceptance/video-data transfer section 220; and an internal bus for interconnecting them. When a transfer request for video data is accepted from a client, the transfer-request acceptance/video-data transfer section 220 transfers the request to the processor 230 via the internal bus. The processor 230 processes the transfer request, and issues a transfer instruction to the transfer-request acceptance/video-data transfer section 220. In accordance with that instruction, the transfer-request acceptance/video-data transfer section 220 issues a video-data transfer request to the storage-device interface 210, which then retrieves the requested video data from the storage device 240 and transfers it to the transfer-request acceptance/video-data transfer section 220 for transferring to the client over a network.

Figure 3:
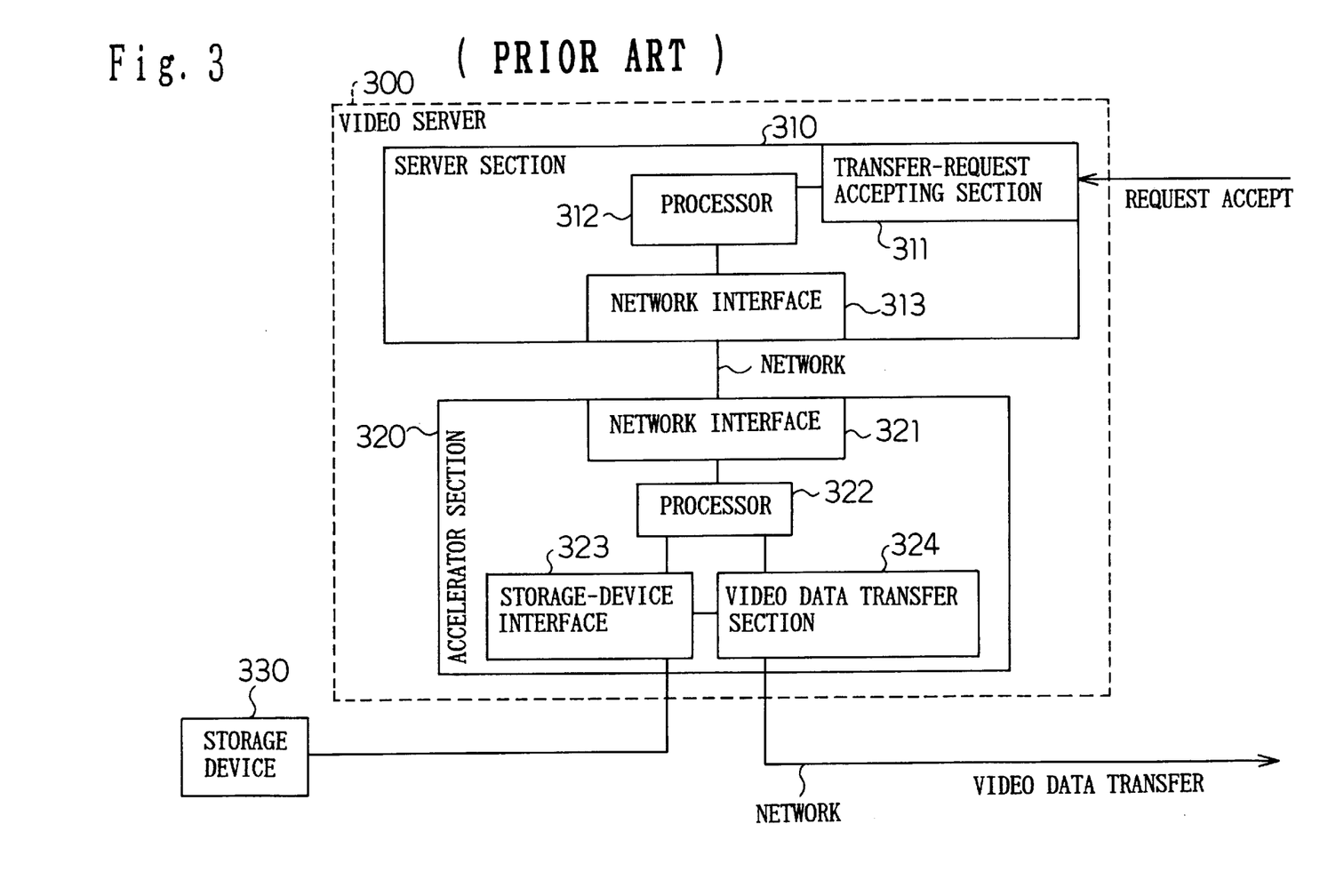
FIG. 3 is a schematic diagram of a system using a video server of a network-connection type according to the prior art.

FIG. 3 is a diagram showing an example in which a plurality of entities constitute a video server as a system. The video server 300 is implemented by a configuration where a server section 310, a computer, and an accelerator section 320, another computer, are interconnected via a network. The server section 310 comprises a transfer-request accepting section 311 and a processor 312 connected together, and a network interface 313 connected to the processor 312. The accelerator section 320 comprises a network interface 321 and a processor 322 connected together, and a storage-device interface 323 and video-data transfer section 324 connected to the processor 322. The storage-device interface 323, which interfaces to a storage device 330, is also connected to the video-data transfer section 324. The transfer-request accepting section 311 transfers a video-data transfer request to the processor 312 which, after processing the request, sends a transfer instruction to the accelerator section 320 via the network interface 313. In the accelerator section 320, the transfer instruction received via the network interface 321 is passed to the processor 322; under the control of the processor 322, the requested video data is transferred from the storage device 330 to the video-data transfer section 324 via the storage-device interface 323.

In this configuration, since data transfer between the server section 310 and the accelerator section 320 is performed via a network, network protocol servicing must be performed in both the server and accelerator processors.

Some bus-connection configurations incorporate a DMA mechanism. In such configurations, the termination of a DMA transfer is processed by an interrupt.

Figure 5:
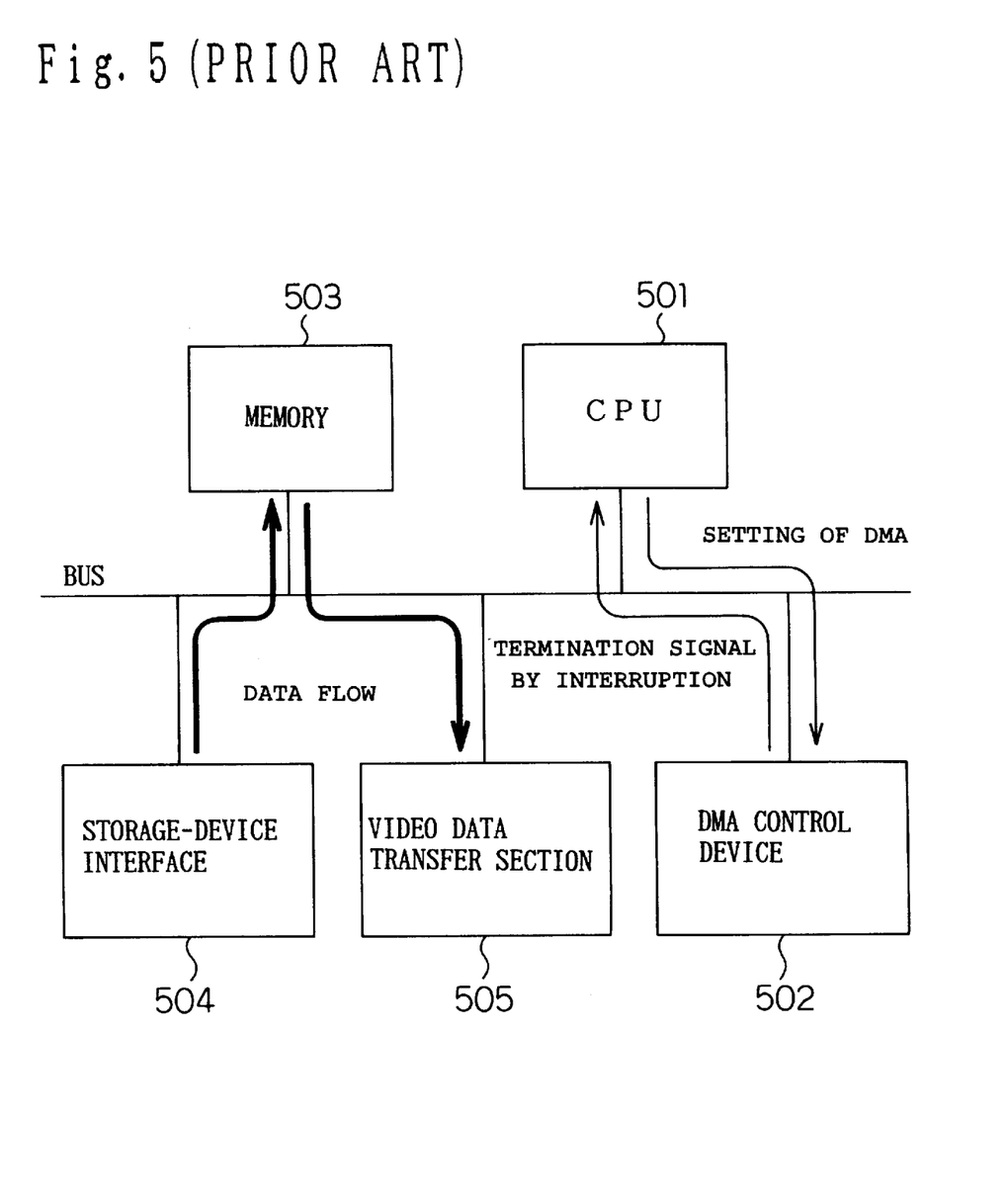
FIG. 5 is a schematic diagram of a system for explaining a conventional DMA controlling method.

FIG. 5 shows one example of a conventional DMA controlling method. CPU 501, DMA control device 502, and memory 503 are provided in the processor 230 of FIG. 2. In FIG. 5 CPU 501 sets DMA every transfer request for DMA control device 502 on the basis of a video data transfer request received via a network. Thus the storage-device interface 504 reads out video data from the storage device and writes it into the memory 503 and then the read out video data is transferred from the memory 503 to a video data transfer section 505 and further is issued to a network. Next the DMA control device 502 informs the termination of the video data transferring by use of interruption to the CPU 501 after the transferring of the video data for the transfer request is finished. Thus the video data transferring is successively executed until the transfer request from the client is completed.

Processing by interrupts is more effective than processing by polling in reducing the processing time of a control processor for operations occurring at random times. Since large-volume data transfer operations in prior known computers are of random nature, the use of interrupts in DMA transfers has been effective.

The multimedia server of the present invention is capable of handling both video data and ordinary computer-generated text data. Designed for video only, the prior art video servers of the above configurations have been inefficient as multimedia servers.

Because in the configuration of FIG. 2, the transfer-request acceptance/video-data transfer section 220 accepts a request from a client and transfers it via the bus to the server processor, which, after processing the request, sends a transfer instruction to the transfer-request acceptance/video-data transfer section 220, again via the bus. That is, a section for accepting a transfer request from a client and a section for transferring transferred data are incorporated into one unit; therefore, the transfer request must first be transferred to the server processor for processing, and after that, the retrieved data must be transferred to the transferred-data transfer section. Furthermore, the transfer request, the transfer instruction, and the retrieved data are transferred on the same bus.

In this configuration, since the transfer request and transfer instruction are transferred on the same bus, bus usage per transfer is high; this causes the problem that the number of clients that can be serviced becomes limited, since bus usage increases with increasing number of clients issuing transfer requests.

Furthermore, in this configuration, video data that demands real-time transferring and text data that does not are transferred out from the same interface; as a multimedia server that handles text data as well as video data, this also limits the number of clients that can be serviced.

Moreover, in the bus-connection configuration employing a DMA method for the transfer of transfer instructions, the termination of a transfer is notified by an interrupt; in the case of video data transfers, transfer instructions, though not large in volume, are issued frequently and regularly, so that the ratio of the time occupied by interrupt processing is relatively large. This also contributes to limiting the number of clients that can be serviced.

In the configuration of FIG. 3, unlike the configuration of FIG. 2, the transfer request and the transfer instruction are not transferred on the same bus, but since instruction data is transferred via an ordinary network, not via an internal bus, network protocol servicing to implement the transfer of instruction data is performed in both the server and accelerator processors. This involves a larger amount of processing than the processing of a transfer via a bus does, and the number of client requests that can be serviced is limited by the performance limit of the respective processors. Furthermore, in this configuration, ordinary text data, etc. are transferred on the same path as video data, and also, a request from a client is transferred from the same interface that handles video data. As a multimedia server that handles text data as well as video data, this also contributes to limiting the number of clients.

SUMMARY OF THE INVENTION

The present invention is intended to resolve the above-outlined problems of the prior art, and it is an object of the invention to provide a multimedia server capable of servicing requests from a large number of clients, which comprises a server section having a transfer-request accepting section for accepting a transfer request for data such as video data and text data, and a processor for discriminating the kind of data and for issuing a transfer instruction, and an accelerator section responsible for video data transfer processing, wherein the server section and the accelerator section are connected via a bus; furthermore, the multimedia server may include a plurality of accelerator sections so that the number of clients that can be serviced can be expanded by increasing the number of accelerators.

To accomplish the above object, the present invention provides a multimedia server comprising: a server section having a transfer-request accepting section for accepting a transfer request for data, a processor, connected to the transfer-request accepting section, for discriminating the kind of the data and for converting the transfer request to a transfer instruction, and a bus interface; a storage device for storing data; an accelerator section having a storage-device interface for interfacing to the storage device and for retrieving data therefrom, a data transfer section for transferring the data, a processor for processing the transfer instruction issued from the server section, and for issuing a transfer instruction to have the data transferred from the storage-device interface to the data transfer section and then issuing a transfer instruction to the data transfer section to transfer the data to a requesting destination, and a bus interface; and a bus for connecting the server section with the accelerator section.

Preferably, the server section of the multimedia server further includes a storage-device interface for interfacing to a storage device which is a different device than the storage device connected to the accelerator section.

Preferably, the data handled by the multimedia server refers to any kind of data selected from video data, voice data, text data, and still image data, or to particular kinds of data selected from these kinds of data.

Preferably, in the multimedia server, the storage device connected to the server section stores text or still image data, and the server section further includes a text data transfer section for transferring text or still image data, while the storage device connected to the accelerator section stores video data or voice data.

Preferably, the multimedia server includes a plurality of accelerator sections, each having the same configuration as described above.

Preferably in the multimedia server a mechanism for giving and taking of said transfer-request between said server section and said accelerator section by using a DMA, is provided and wherein
all or a part of an interrupt concerning with termination of data transferring from the accelerator section to the server section, is not executed but the accelerator section executes to read said transfer-request from the server section by using a preset timer.

The present invention is capable of servicing requests from a large number of clients by providing a configuration comprising, for example, a server section having a transfer-request accepting section for accepting a transfer request for data such as video data and text data, and a processor for discriminating the kind of data and for issuing a transfer instruction; and an accelerator section responsible for video data transfer processing wherein the server section and the acceleration section are connected via a bus having a plurality of accelerator sections, thereby enabling the number of clients that can be serviced to be increased by increasing the number of accelerator sections. The present invention also provides a multimedia server capable of handling a larger number of clients by providing a configuration wherein when transferring instructions between the server section and accelerator section connected via a bus, the processor need not execute an interrupt service routine, alleviating processing burden of the processor.

DESCRIPTION OF THE REFERENCE NUMERALS

100. Multimedia server, 110 Server section, 111. Storage-device interface, 112. Storage device, 113. Processor, 114. Bus interface, 115. Transfer-request accepting section, 116. Text data transfer section, 120. Accelerator section, 121. Bus interface, 122. Processor, 123. Storage-device interface, 124. Video data transfer section, 130. Accelerator section, 131. Bus interface, 132. Processor, 133. Storage-device interface, 134. Video data transfer section, 140. Storage device, 150. Storage device, 200. Video server, 210. Storage-device interface, 220. Transfer-request acceptance/video-data transfer section, 230. Processor, 240. Storage device, 300. Video server, 310 Server section, 311. Transfer-request accepting section, 312. Processor, 313. Network interface, 320. Accelerator section, 321. Network interface, 322. Processor, 323. Storage-device interface, 324. Video data transfer section, 330. Storage device, 400. Multimedia server, 410. Server section, 411. Transfer-request accepting section, 412. Processor, 413. Instruction storing memory, 414. Bus interface, 420. Accelerator section, 421. Bus interface, 422. Timer section, 423. Processor, 424. Transfer processing memory, 425. Video data input/output section, 430. Storage device, 501. CPU, 502.DMA control device, 503. memory, 504. storage-device interface, 505. video data transfer section:

DESCRIPTION OF THE PREFERRED EMBODIMENTS

The preferred embodiments of the present invention will be described below with reference to the accompanying drawings.

Figure 1:
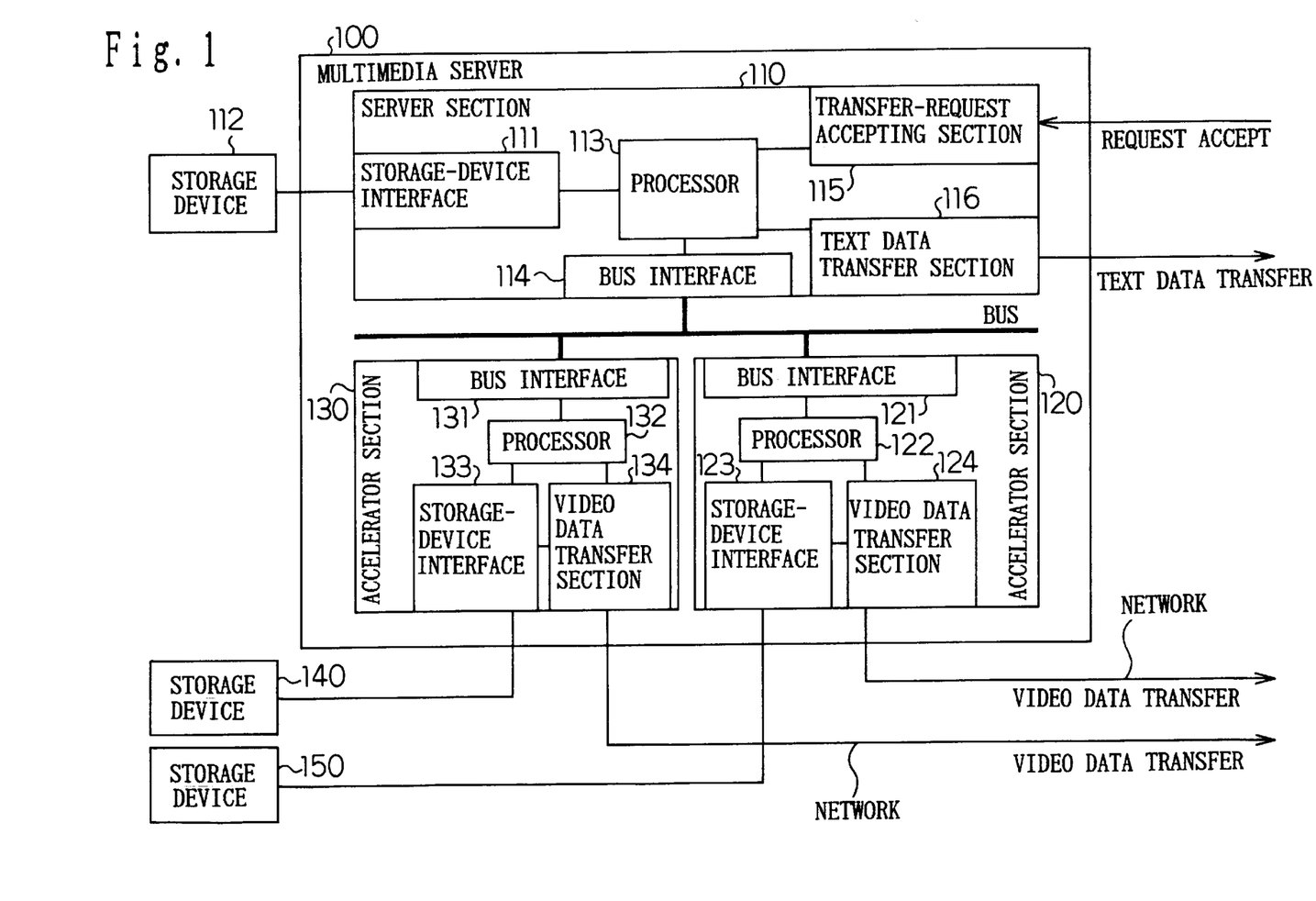
FIG. 1 is a schematic diagram of a system using a multimedia server according to a first embodiment of the present invention.

FIG. 1 shows the configuration of a multimedia server according to a first embodiment of the invention. The multimedia server 100 comprises a server section 110, an accelerator section 130, an accelerator section 120, and an internal bus for interconnecting them. The server section 110 comprises a storage-device interface 111 for interfacing to a storage device 112, a processor 113 connected to the interface 111, and a transfer-request accepting section 115, text data transfer section 116, and bus interface 114 connected to the processor 113. The text data transfer section 116 sends out text data (or still image data) onto a network. The bus interface 114 is connected to the accelerator sections 120 and 130 via the internal bus. The accelerator section 120 comprises a bus interface 121 connected to the internal bus, a processor 122 connected to the bus interface 121, and a storage-device interface 123 and video data transfer section 124 connected to the processor 122. The storage-device interface 123 is connected to a storage device 150, and the video data transfer section 124 sends out video data (or voice data) onto the network. The accelerator section 130 comprises a bus interface 131 connected to the internal bus, a processor 132 connected to the bus interface 131, and a storage-device interface 133 and video data transfer section 134 connected to the processor 132. The storage-device interface 133 is connected to a storage device 140, and the video data transfer section 134 sends out video data onto the network.

When a video transfer request for video data stored on the storage device 140 is issued from a client via the network, and accepted by the transfer-request accepting section 115, the request is transferred to the processor 113. The processor 113 examines the request to determine whether it is for video transfer or text transfer, etc., and if it is found that the request is for transfer of video data stored on the storage device 140, the processor 113 sends a video transfer instruction to the processor 132 in the accelerator section 130 via the bus interface 114, the internal bus, and the bus interface 131. The processor 132 performs computations to determine the transfer start position of the video data in the storage device 140, the size of the data to be transferred, etc., retrieves the requested video data from the storage device 140 via the storage-device interface 133, and performs processing for network transfer. The video data is then transferred via the video data transfer section 134 onto the network.

When a video transfer request for video data stored on the storage device 150 is issued from a client via the network, and accepted by the transfer-request accepting section 115, the request is transferred to the processor 113. The processor 113 examines the request to determine whether it is for video transfer or text transfer, etc., and if it is found that the request is for transfer of video data stored on the storage device 150, the processor 113 sends a video transfer instruction to the processor 122 in the accelerator section 120 via the bus interface 114, the internal bus, and the bus interface 121. The processor 122 performs computations to determine the transfer start position of the video data in the storage device 150, the size of the data to be transferred, etc., retrieves the requested video data from the storage device 150 via the storage-device interface 123, and performs processing for network transfer. The video data is then transferred via the video data transfer section 124 onto the network.

In configurations such as the prior art example shown in FIG. 3, where the server section and the accelerator section are connected via a network, the respective processors are required to perform network protocol servicing to implement the transfer of a video data transfer instruction; this consumes some of the processors' time that can be used for the above computations. Therefore, such configurations can service a fewer clients than the bus-connection configuration of the present embodiment can.

When a transfer request for text data stored on the storage device 112 is issued from a client via the network, and accepted by the transfer-request accepting section 115, the request is transferred to the processor 113. The processor 113 examines the request to determine whether it is for video transfer or text transfer, etc., and if it is found that the request is for transfer of text data stored on the storage device 112, the processor 113 performs computations to determine the transfer start position of the text data in the storage device 112, the size of the data to be transferred, etc., retrieves the requested text data from the storage device 112 via the storage-device interface 111, and performs processing for network transfer. The text data is then transferred via the text data transfer section 116 onto the network. In the prior art configuration of FIG. 3, the transfer of text data can be implemented functionally, but in the prior art, since text data also is transferred to the accelerator section, this will put an extra computational burden on the video data transfer processor in the accelerator, reducing the number of clients that can be serviced as compared to the configuration of the present embodiment.

Assume that, in the present embodiment, the video data transfer rate is 5 MB/second, the size of transfer request data necessary for requesting a transfer of 1 MB of video data is 10 KB, the size of transfer instruction data, when the transfer request of 10 KB in size is converted to a transfer instruction internal to the multimedia server, is 20 KB, the maximum transfer rate of the internal bus is 4 MB/second, and the maximum transfer capacity of each accelerator is 50 MB/second, that is, each accelerator has a capacity that can service requests from up to 10 clients.

When 20 clients are attached to the network, the multimedia server must provide a maximum video data transfer capacity of 5 MB/second ×20=100 MB/second, with the transfer rate of transfer requests being (100 MB/second ÷1 MB)×10 KB=1 MB/second, which means that video data transfer instructions after being processed by the processor must be transferred at 2 MB/second.

When handling requests from 20 clients, the server section 110 in the multimedia server 100 accepts the transfer requests of 1 MB/second by the transfer-request accepting section 115, and transfers them to the processor 113 at 1 MB/second; after processing in the processor 113, video data transfer instructions are transferred to each accelerator section via the bus interface at a rate of 2 MB/second. The bus, which has a maximum transfer capacity of 4 MB/second, can handle this transfer rate. The two accelerator sections each accept the video data transfer instructions of 1 MB/second and transfer video data at 50 MB/second, which means the two accelerator sections together can handle a total of 100 MB/second of video data.

The present embodiment has been described as comprising two accelerator sections, but three or more can be provided as long as the bus transfer capacity permits. For example, with the capacity assumed in the present embodiment, two more accelerator sections can be added. In the present embodiment, only one storage device is connected to the server section, but two or more storage devices can be connected. Furthermore, in the configuration of the present embodiment, the text data storage device is connected to the server section, but it is also possible to store text data in the storage device connected to the accelerator section. Further, the same storage device may be connected to both the server and accelerator sections.

Figure 4:
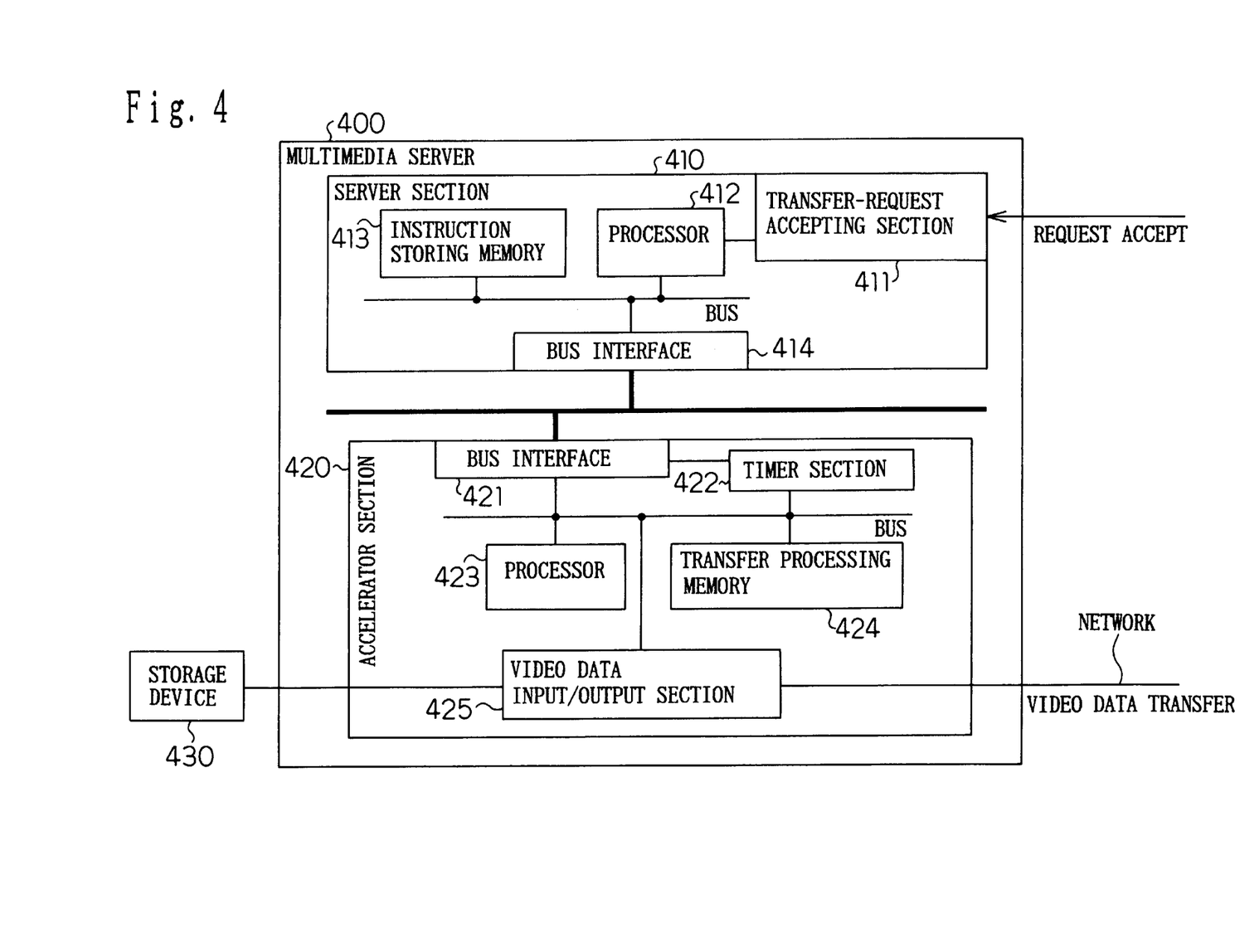
FIG. 4 is a schematic diagram of a system using a DMA technique according to a second embodiment of the present invention.

FIG. 4 shows the configuration of a multimedia server according to a second embodiment of the present invention.

The multimedia server 400 comprises a server section 410 and an accelerator section 420 connected to it via an internal bus. The server section 410 comprises a processor 412, an instruction storing memory 413 connected to it via a bus, a transfer-request accepting section 411 for accepting a transfer request from a client external to the server, and a bus interface 414. The bus interface 414 is connected to the accelerator section 420 via the internal bus. The accelerator section 420 comprises a bus interface 421 connected to the internal bus, a timer section 422 connected to the bus interface section 421, a processor 423, a transfer processing memory 424, and a video data input/output section 425. The video data input/output section 425 is connected to a storage device 430 and also to clients external thereto via a network. The respective blocks of the accelerator section 420 are interconnected via a bus. Based on the transfer rate of video data, the processor 412 in the server section 410 determines a location at which an instruction is stored in the instruction storing memory 413, and accordingly sets the bus interface 421 in the accelerator section 420 via the bus interface 414; the processor 412 also sets a transfer instruction request time interval in the timer section 422.

When a transfer request for video data stored on the storage device 430 is issued from a client via the network, and accepted by the transfer-request accepting section 411, the request is transferred to the processor 412. If it is found that the request is for a transfer of video data stored on the storage device 430, the processor 412 stores a video transfer instruction at a prescribed location in the instruction storing memory 413. The processor 412 then sets a transfer instruction request time and a termination time in the timer section 422 via the bus interface 414 and via the bus interface 421 of the accelerator section 420. At a preset time, the timer section 422 notifies the bus interface 421, which then retrieves data from the prescribed location in the instruction storing memory 413 by using a DMA, stores the data in the transfer processing memory 424, and notifies the processor 423 accordingly. After that, the processor 423 performs video data transfer processing, and transfers the video data from the storage device 430 to the video data input/output section 425 for transferring over the network. After that preset time, the timer section 422 notifies the bus interface 421 at preset intervals of time.

When notified, the bus interface 421 retrieves data from the prescribed location in the instruction storing memory 413 by using a DMA, stores the data in the transfer processing memory 424, and notifies the processor 423 accordingly. After that, the processor 423 performs video data transfer processing, and transfers the video data from the storage device 430 to the video data input/output section 425 for transferring over the network. This process is repeated until a preset termination time arrives.

In an ordinary DMA method, upon termination of each transfer unit, the processor 412 would be notified by an interrupt of the termination of the transfer and would have to service the interrupt accordingly. Likewise, upon termination of each transfer unit, the processor 423 would be notified by an interrupt of the termination of the transfer and would have to service the interrupt accordingly. After that, settings would have to be made over again for the next transfer. Furthermore, some of the processors' computing time would be consumed by interrupt servicing. These factors combined, the number of clients that can be serviced would be reduced, compared to the method of the present embodiment.

The present embodiment employs a data transfer method that utilizes the property that video data has a uniform transfer rate and does not execute an interruption with regard to the informing termination of video data transferring against the server. In the case of ordinary text data, there is no guarantee that a transfer request will be issued within a predetermined time; if a DMA transfer method as prescribed in the present embodiment is applied to text data, there may occur a situation where a data transfer is attempted when there is no transfer request. Furthermore, this method cannot handle more transfer requests than the predetermined time interval allows. However, the present embodiment provides a very effective method for processing data such as video data that has a uniform transfer rate.

As described, the present invention provides a system comprising: a server section having a transfer-request accepting section for accepting a transfer request for data, such as video data and text data, and a processor for discriminating the kind of data and for issuing a transfer instruction; and an accelerator section responsible for video data transfer processing, wherein an interface is provided to enable a device for storing data such as video data and text data to be connected to the accelerator section, or wherein an interface is provided to enable a device for storing data such as video data and text data to be connected to the server section, thereby constructing a system capable of servicing requests from a large number of clients. Furthermore, the invention provides a system that can include a plurality of accelerator sections so that the number of clients that can be serviced can be increased by increasing the number of accelerators. Moreover, the invention includes a mechanism for transferring data between the server and accelerator sections via a bus by using a DMA, and for enabling a DMA transfer to be initiated and terminated using a preset timer.

Meanwhile in the above embodiments all the interruption process with regard to the informing termination of data transferring is replaced with the using of timer but a part of the interruption process with regard to the informing termination of data transferring can be replaced with the using of timer.

The data mentioned in connection with the present invention refers to any kind of data selected from video data, voice data, text data, and still image data, or to particular kinds of data selected from these kinds of data.

As is apparent from the above description, the present invention provides a system that can service a large number of clients by achieving a reduction in processing burden on the server and accelerator sections.

What is claimed is:

1. A multimedia server comprising:
   a server section including:
      a transfer-request accepting section accepting a transfer request for data,
      a processor connected to said transfer-request accepting section, said processor determining the kind of data and converting said transfer request to a transfer instruction; and
      a bus interface;
   a storage device for storing data;
   an accelerator section including:
      a storage-device interface interfacing with said storage device and retrieving data therefrom,
      a data transfer section transferring said data,
      a processor processing said transfer instruction issued from said server section, and issuing a transfer instruction to have said data transferred from said storage-device interface to said data transfer section and then issuing a transfer instruction to said data transfer section to transfer said data to a requesting destination, and a bus interface; and a bus for connecting said server section with said accelerator section.

2. A multimedia server according to claim 1, wherein said server section further includes a storage-device interface for interfacing to a storage device which is a different device than the storage device connected to said accelerator section.

3. A multimedia server according to claim 1, wherein data refers to any kind of data selected from video data, voice data, text data, and still image data, or to particular kinds of data selected from these kinds of data.

4. A multimedia server according to claim 1, wherein the storage device connected to said server section stores text or still image data, and said server section further includes a text data transfer section for transferring text or still image data, while the storage device connected to said accelerator section stores video data or voice data.

5. A multimedia server according to claim 1, wherein a plurality of accelerator sections are connected.

6. A multimedia server according to claim 1, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

7. A multimedia server according to claim 2, wherein the storage device connected to said server section stores text or still image data, and said server section further includes a text data transfer section for transferring text or still image data, while the storage device connected to said accelerator section stores video data or voice data.

8. A multimedia server according to claim 2, wherein a plurality of accelerator sections are connected.

9. A multimedia server according to claim 2, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

10. A multimedia server according to claim 3, wherein the storage device connected to said server section stores text or still image data, and said server section further includes a text data transfer section for transferring text or still image data, while the storage device connected to said accelerator section stores video data or voice data.

11. A multimedia server according to claim 3, wherein a plurality of accelerator sections are connected.

12. A multimedia server according to claim 3, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

13. A multimedia server according to claim 4, wherein a plurality of accelerator sections are connected.

14. A multimedia server according to claim 4, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

15. A multimedia server according to claim 5, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

16. A multimedia server according to claim 7, wherein a plurality of accelerator sections are connected.

17. A multimedia server according to claim 16, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

18. A multimedia server according to claim 10, wherein a plurality of accelerator sections are connected.

19. A multimedia server according to claim 18, further including a mechanism for giving and taking of said transfer-request between said server section and said accelerator section by using a DMA, and wherein all or a part of an interrupt concerning with termination of data transferring from the accelerator section to the server section, is not executed but the accelerator section executes to read said transfer-request from the server section by using a preset timer on which a start and a termination of the DMA is set beforehand.

* * * * *